United States Patent
Tsuchida et al.

(10) Patent No.: US 11,994,201 B2
(45) Date of Patent: May 28, 2024

(54) POWER TRANSMISSION DEVICE FOR WORK VEHICLE

(71) Applicant: KUBOTA CORPORATION, Osaka (JP)

(72) Inventors: Tomonari Tsuchida, Osaka (JP); Atsuro Hayami, Osaka (JP); Hiroyuki Sadamoto, Osaka (JP); Keitaro Morinaga, Osaka (JP); Kazuhiro Wada, Osaka (JP); Rikuto Araki, Osaka (JP); Ryoma Iwase, Osaka (JP); Tomoyuki Tanaka, Osaka (JP); Takahiro Matsuo, Osaka (JP); Hiroyuki Aikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/525,262

(22) Filed: Nov. 12, 2021

(65) Prior Publication Data
US 2022/0205526 A1    Jun. 30, 2022

(30) Foreign Application Priority Data

Dec. 28, 2020  (JP) .................. 2020-218795
Jun. 15, 2021  (JP) .................. 2021-099698

(51) Int. Cl.
*F16H 57/02*    (2012.01)
*F16H 57/021*   (2012.01)
*F16H 57/04*    (2010.01)

(52) U.S. Cl.
CPC ....... *F16H 57/021* (2013.01); *F16H 57/0409* (2013.01); *F16H 57/0423* (2013.01); *F16H 57/0457* (2013.01)

(58) Field of Classification Search
CPC ........ F16H 57/02; F16H 57/021; F16H 57/03; F16H 57/0457; F16H 57/0409; F16H 57/0423
See application file for complete search history.

(56) References Cited

U.S. PATENT DOCUMENTS 1,970,385 A * 8/1934 Maybach ............ F16H 57/0434
                                                      184/6.12
3,802,289 A * 4/1974 Cheek .................. F16H 57/021
                                                      74/606 R (Continued)

FOREIGN PATENT DOCUMENTS

DE   11 2013 004746 T5    8/2015
EP         0294697 A1  * 12/1988

(Continued)

OTHER PUBLICATIONS

Machine translation of EP 0294697 A1 obtained on Sep. 7, 2023.*

(Continued)

*Primary Examiner* — Adam D Rogers
(74) *Attorney, Agent, or Firm* — Greenblum & Bernstein, P.L.C.

(57) ABSTRACT

A power transmission device for a work vehicle includes a transmission case, a gear transmission housed in the transmission case and configured to transmit power to a travel device, and a transmission gear provided in the gear transmission in a state of sitting in lubricating oil stored in an internal space of the transmission case, the transmission case being provided with a wall part supporting a support shaft of the transmission gear in a state of being adjacent to the transmission gear, and the wall part being provided with a cover part protruding toward the outer periphery of the transmission gear from the wall part and covering the transmission gear.

7 Claims, 10 Drawing Sheets

(56) References Cited

U.S. PATENT DOCUMENTS

| | | | |
|---|---|---|---|
| 7,984,791 B2* | 7/2011 | Taguchi | F16H 57/0483 |
| | | | 184/6.12 |
| 8,528,697 B2* | 9/2013 | Mordukhovich | F16H 57/0483 |
| | | | 184/6.12 |
| 8,875,841 B2* | 11/2014 | Yoshimi | F16H 57/0409 |
| | | | 184/6.12 |
| 9,772,027 B2* | 9/2017 | Preston | F16H 57/0409 |
| 10,260,616 B2* | 4/2019 | Lee | F16H 57/0423 |
| 10,781,909 B2* | 9/2020 | Graves | F16H 57/0471 |
| 10,935,109 B2* | 3/2021 | Hana | F15B 21/041 |
| 11,149,838 B2* | 10/2021 | Hagino | F01M 9/06 |
| 11,644,091 B2* | 5/2023 | Iwaki | F16H 57/021 |
| | | | 475/83 |
| 2006/0048600 A1 | 3/2006 | Taguchi et al. | |
| 2010/0038174 A1 | 2/2010 | Mordukhovich et al. | |
| 2012/0286607 A1 | 11/2012 | Shimizu et al. | |
| 2017/0102066 A1 | 4/2017 | Lee et al. | |
| 2019/0186621 A1 | 6/2019 | Hagino et al. | |
| 2021/0332875 A1 | 10/2021 | Tsuchida et al. | |
| 2022/0153132 A1* | 5/2022 | Sonoda | B60T 1/062 |
| 2022/0196135 A1* | 6/2022 | Tamura | F16H 57/045 |
| 2022/0316570 A1* | 10/2022 | Iwaki | F16H 57/021 |

FOREIGN PATENT DOCUMENTS

| | | | | |
|---|---|---|---|---|
| EP | 1864036 B1 * | 9/2008 | | F16H 57/021 |
| EP | 3 502 515 A1 | 6/2019 | | |
| JP | 55-86142 | 6/1980 | | |
| JP | 2016-3761 | 1/2016 | | |
| JP | 2019-95058 A | 6/2019 | | |
| JP | 2021-63536 | 4/2021 | | |
| WO | 2012/153589 | 11/2012 | | |
| WO | 2014/062116 A1 | 4/2014 | | |
| WO | 2015/058788 A1 | 4/2015 | | |
| WO | 2020/137059 | 7/2020 | | |

OTHER PUBLICATIONS

Extended European Search Report issued in European Patent Application No. 21208335.6 dated Apr. 28, 2022.

Office Action issued in Corresponding JP Patent Application No. 2020-218795, dated Sep. 5, 2023, along with an English translation thereof.

Office Action issued in Corresponding JP Patent Application No. 2021-099698, dated Feb. 27, 2024, along with an English translation thereof.

Office Action issued in Corresponding JP Patent Application No. 2020-218795, dated Feb. 6, 2024, along with an English translation thereof.

Office Action issued in Corresponding EP Patent Application No. 21208335.6, dated Feb. 26, 2024.

* cited by examiner

POWER TRANSMISSION DEVICE FOR WORK VEHICLE

BACKGROUND OF THE INVENTION

1. Field of the Invention

The present invention relates to a power transmission device for a work vehicle.

2. Description of the Related Art

Power transmission devices for work vehicles include a transmission case and a gear transmission that is housed in the transmission case and transmits power to a travel device. Some power transmission devices for work vehicles of this type include a transmission gear that is provided in the gear transmission in a state where the transmission gear is sitting in lubricating oil that is stored in the internal space of the transmission case. A power transmission device for a tractor shown in Patent Document 1 (JP 2019-95058A) is an example of this type of power transmission device for a work vehicle. The power transmission device for a tractor shown in Patent Document 1 includes a gear transmission (shift transmission device, forward/reverse switching device).

There is demand for work vehicles that can perform high speed travel such that work proceeds efficiently. In the above-described power transmission device for a work vehicle, in the case where the travelable speed is changed to high speed, the transmission gear sitting in lubricating oil rotate fasters while agitating the lubricating oil, and a large drive load acts on the transmission gear, resulting in an increase in transmission loss in the gear transmission.

The present invention provides a power transmission device for a work vehicle capable of driving a travel device at high speed while suppressing an increase in transmission loss in a gear transmission caused by a transmission gear that is sitting in lubricating oil, and achieving a countermeasure structure in a simple manner.

SUMMARY OF THE INVENTION

A power transmission device for a work vehicle according to the present invention includes a transmission case, a gear transmission housed in the transmission case and configured to transmit power to a travel device, and a transmission gear provided in the gear transmission in a state of sitting in lubricating oil stored in an internal space of the transmission case, the transmission case being provided with a wall part supporting a support shaft of the transmission gear while being adjacent to the transmission gear, and the wall part being provided with (i) a cover part protruding from the wall part toward an outer periphery of the transmission gear and covering the transmission gear, or (ii) a recessed part in which the transmission gear sits.

According to this configuration, due to the cover part that protrudes toward the outer periphery of the transmission gear from the wall part and covers the transmission gear being provided, agitation of lubricating oil that occurs due to the transmission gear being rotated is inhibited from spreading to the lubricating oil storage area by the cover part, and thus the rotation speed of the transmission gear can be increased while suppressing an increase in the drive load that acts on the transmission gear, making it possible to drive the travel device at high speed while suppressing an increase in transmission loss in the gear transmission. The cover part need only protrude from the wall part, and the protruding length of the cover part can be kept short because the cover part protrudes from the wall part adjacent to the transmission gear, thus enabling a countermeasure structure to be achieved in a simple manner.

Also, according to this configuration, due to the wall part including the recessed part in which the transmission gear sits, the lubricating oil is agitated by the rotating transmission gear in the recessed part and agitation of the lubricating oil by the transmission gear tends not to spread to the lubricating oil storage area, and thus the rotation speed of the transmission gear can be increased while suppressing an increase in the drive load that acts on the transmission gear due to the lubricating oil. It is possible to drive the travel device at high speed while suppressing an increase in transmission loss in the gear transmission, while at the same time achieving a structure that inhibits lubricating oil agitation by the transmission gear from spreading to the lubricating oil storage area with a simple structure that merely involves providing the recessed part in the wall part.

In the present invention, it is favorable for the cover part to be arc-shaped as viewed in a direction of an axis of the support shaft.

According to this configuration, the cover part can be brought close to the transmission gear along its full length, thus enabling agitation of the lubricating oil by the transmission gear to be effectively inhibited from spreading to the lubricating oil storage area.

In the present invention, it is favorable for the cover part to be integrally molded with the wall part.

According to this configuration, a support structure for supporting the cover part with the wall part can be achieved in a simple manner, thus enabling agitation of the lubricating oil by the transmission gear to be inhibited from spreading to the lubricating oil storage area, while suppressing an increase in the number of components that are required.

In the present invention, it is favorable that the power transmission device further includes a cover part protruding from the wall part toward outside the recessed part and circumferentially covering a region of the transmission gear which region is located outside the recessed part.

According to this configuration, agitation of the lubricating oil by a region of the transmission gear which region is located outside the recessed part is inhibited from spreading to the lubricating oil storage area by the cover part, thus enabling the rotation speed of the transmission gear to be increased while further suppressing an increase in the drive load that acts on the transmission gear due to the lubricating oil, making it possible to drive the travel device at high-speed while further suppressing an increase in transmission loss in the gear transmission.

In the present invention, it is favorable for the cover part to protrude from a region of the wall part along a periphery of the recessed part.

According to this configuration, the cover part is provided with a rib function of reinforcing the wall part in a region of the wall part that is located on the periphery of the recessed part, and is thus able to suppress an increase in the drive load that acts on the transmission gear due to the lubricating oil, while at the same time preventing a reduction in strength caused by the recessed part of the wall part.

In the present invention, it is favorable for the wall part to be provided with a shaft support part supporting the support shaft of the transmission gear in a state where the support shaft is disposed through the shaft support part.

According to this configuration, the wall part supporting the transmission gear is utilized for the wall part that inhibits agitation of the lubricating oil by the transmission gear from spreading to the lubricating oil storage area, and thus a special wall part for inhibiting lubricating oil agitation from spreading to the lubricating oil storage area need not be provided, enabling the rotation speed of the transmission gear to be increased while suppressing an increase in the drive load that acts on the transmission gear while avoiding making the transmission case more complex.

DETAILED DESCRIPTION OF PREFERRED EMBODIMENTS

First Embodiment

Hereinafter, an embodiment (first embodiment) serving as an example of the present invention will be described based on the drawings.

Figure 1:
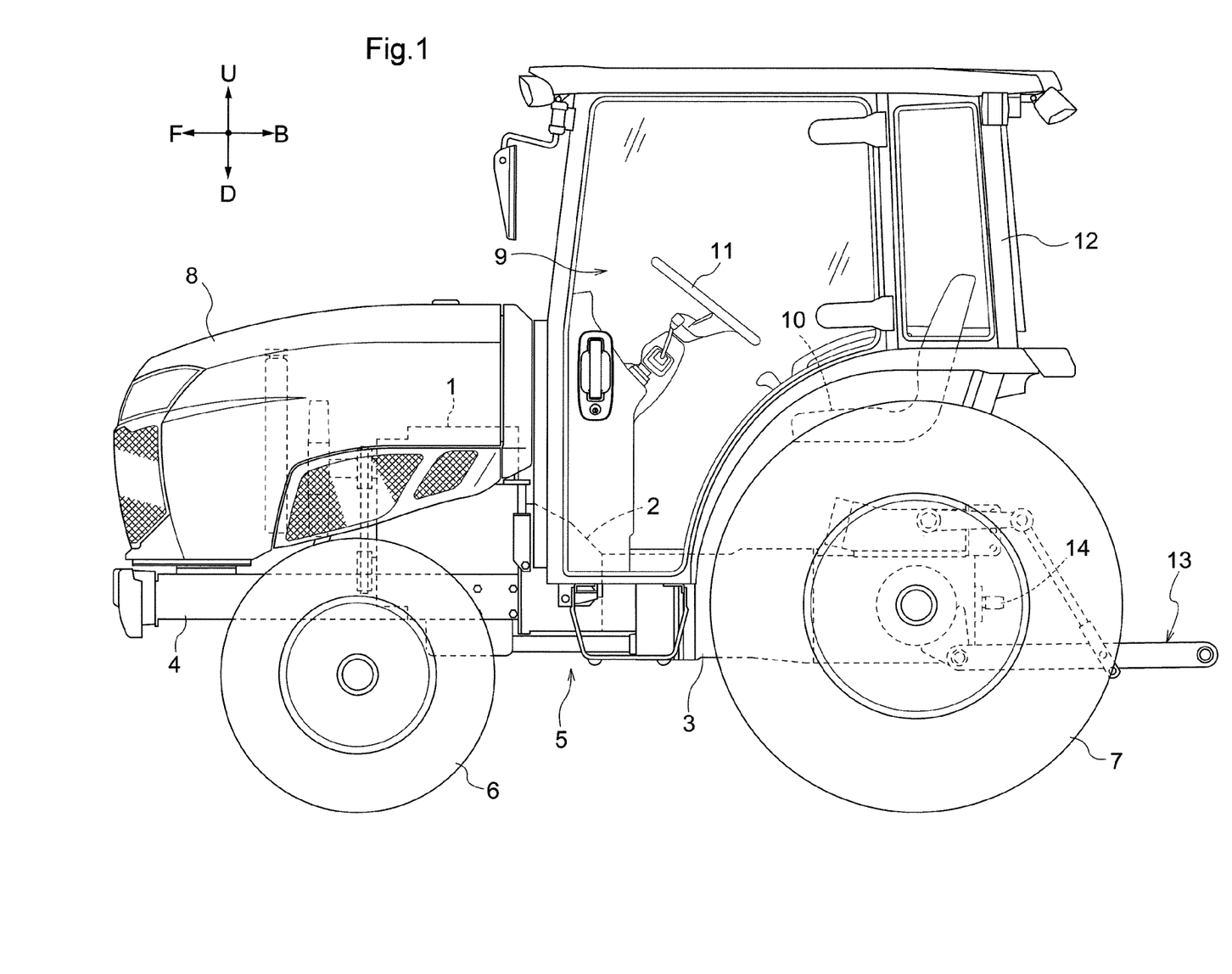
FIG. 1 is a diagram showing a first embodiment (same until FIG. 10), and is a left side view showing an overall tractor.

Note that, in the following description, in relation to the traveling vehicle body of a tractor (example of "work vehicle"), the direction of arrow F shown in FIG. 1 is "vehicle body forward", the direction of arrow B is "vehicle body rearward", the direction of arrow U is "vehicle body upward", the direction of arrow D is "vehicle body downward", the front side direction on the page is "vehicle body leftward", and the back side direction on the page is "vehicle body rightward".

Overall Tractor

The traveling vehicle body of the tractor has a vehicle body frame 5 constituted by an engine 1 and the like, a pair of right and left front wheels 6 serving as a travel device drivably provided in a front portion of the vehicle body frame 5, and a pair of right and left rear wheels 7 serving as a travel device drivably provided in a rear portion of the vehicle body frame 5. The vehicle body frame 5 is constituted by the engine 1, a clutch housing 2 provided in a rear portion of the engine 1, a transmission case 3 coupled to the clutch housing 2, a front portion frame 4, and the like. The pair of left/right front wheels 6 are steered by being operated in a swinging manner, with a steering axis (not shown) oriented vertically with respect to the vehicle body as the swing fulcrum. A motive part 8 having the engine 1 is formed in a front portion of the traveling vehicle body. A driving part 9 is formed in a rear portion of the traveling vehicle body. The driving part 9 includes a driver's seat 10, a steering wheel 11 for performing steering operation of the front wheels 6, and a cabin 12 that covers an occupant space. In the rear portion of the vehicle body frame 5 is provided a link mechanism 13 for coupling various types of work devices such as a rotary tilling device (not shown) in a liftable/lowerable manner, and a power take off shaft 14 that takes power from the engine 1 and transmits this power to the work device coupled thereto.

Power Transmission Device

Figure 2:
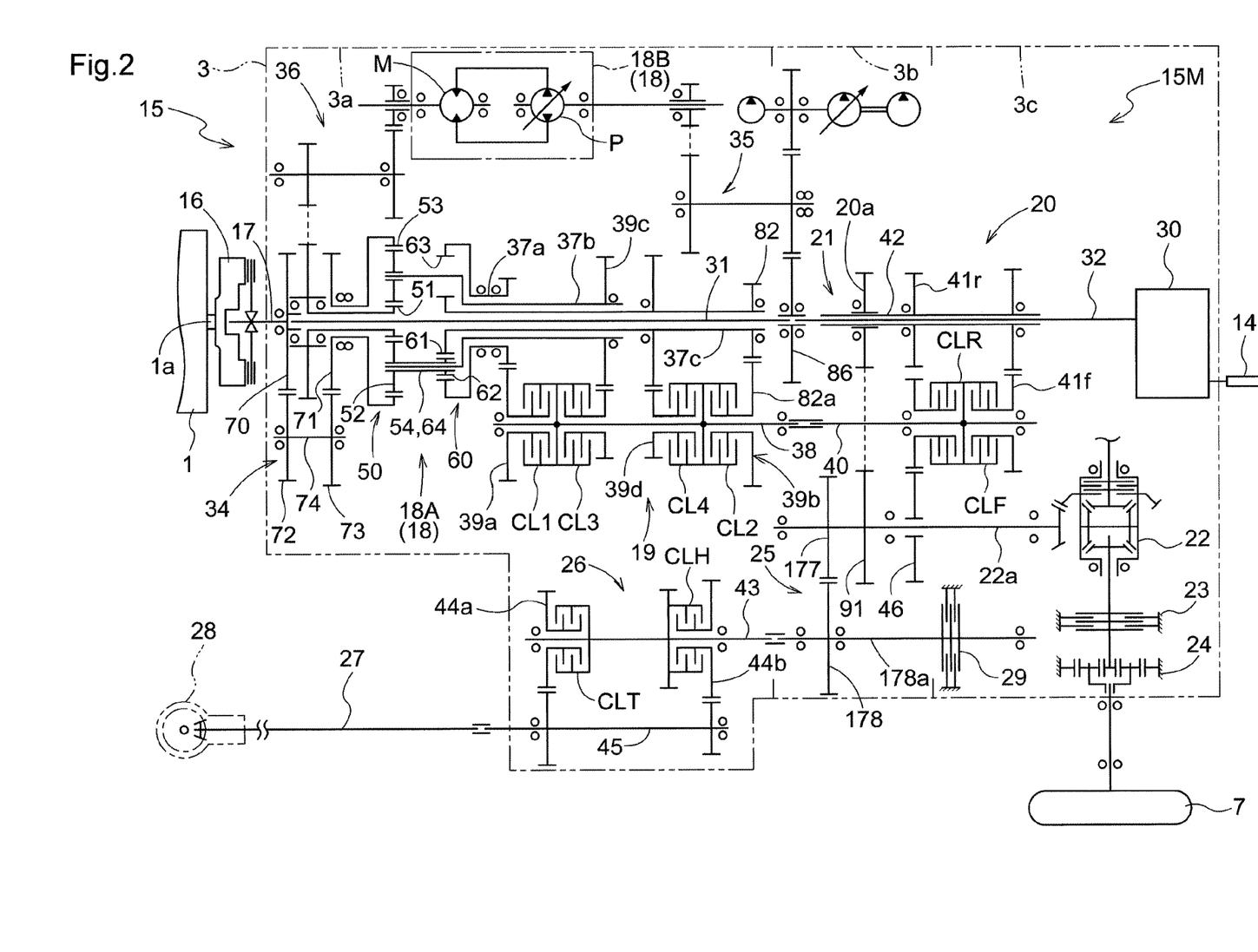
FIG. 2 is a diagram showing a travel transmission device.

A configuration is adopted in which power from the engine 1 is transmitted to the front wheels 6 and the rear wheels 7 by a power transmission device 15 shown in FIG. 2. A transmission case 3 that is provided in the power transmission device 15 is provided in a state where the front-rear direction of the transmission case 3 coincides with the front-rear direction of the traveling vehicle body.

As shown in FIG. 2, the power transmission device 15 includes the transmission case 3 and a gear transmission 15M housed in the transmission case 3. The gear transmission 15M includes a main shift unit 18 coupled to an input shaft 17 of the transmission case 3, a staging transmission unit 19 to which the output of the main shift unit 18 is input, a forward-reverse switching device 20 to which the output of the staging transmission unit 19 is input, a rear wheel differential mechanism 22 to which the output of the forward-reverse switching device 20 is input, and a front wheel transmission device 26 to which the output of the forward-reverse switching device 20 is input.

The main shift unit 18 includes a planetary gear device 18A and a stepless gearbox 18B. A first gear interlocking mechanism 34 that inputs the power of the input shaft 17 to the planetary gear device 18A is coupled to a front portion of the planetary gear device 18A. A second gear interlocking mechanism 35 that inputs the power of the input shaft 17 to the stepless gearbox 18B is coupled to a rear portion of the stepless gearbox 18B. A third gear interlocking mechanism 36 that inputs the output of the step less gearbox 18B to the planetary gear device 18A is coupled to a front portion of the stepless gearbox 18B. A rear wheel gear interlocking mechanism 21 that transmits the output of the forward-reverse switching device 20 to the rear wheel differential mechanism 22 is coupled to a front portion of the forward-reverse switching device 20. A front wheel gear interlocking mechanism 25 that inputs the output of the forward-reverse switching device 20 to the front wheel transmission device 26 is coupled to a rear portion of the front wheel transmission device 26.

As shown in FIG. 2, in the power transmission device 15, the power of an output shaft 1a of the engine 1 is transmitted to the input shaft 17 of the transmission case 3 via a main clutch 16. The power of the input shaft 17 is input to the main shift unit 18, the output of the main shift unit 18 is input to the staging transmission unit 19, and the output of the staging transmission unit 19 is input to the forward-reverse switching device 20. The output of the forward-reverse switching device 20 is transmitted to an input shaft 22a of the rear wheel differential mechanism 22 via the rear wheel gear interlocking mechanism 21. A steering brake 23 and a speed reduction mechanism 24 are provided in a power transmission system that transmits the output of the rear wheel differential mechanism 22 to the rear wheels 7. The speed reduction mechanism 24 is constituted by a planetary gear mechanism. The power of the input shaft 22a of the rear wheel differential mechanism 22 is input to the front wheel transmission device 26 via the front wheel gear interlocking mechanism 25, and is transmitted to a front wheel differential mechanism 28 from the front wheel transmission device 26 via a rotation shaft 27. A parking brake 29 is provided in the front wheel gear interlocking mechanism 25.

Reference numeral 30 shown in FIG. 2 denotes a work gearbox. In the work gearbox 30, the power of the input shaft 17 is input via a rotation shaft 31 and a reverse rotation shaft 32, and the input power undergoes shifting and is transmitted to the power take off shaft 14.

Main Gear Shift Unit

As shown in FIG. 2, the main shift unit 18 includes the planetary gear device 18A and the stepless gearbox 18B. The planetary gear device 18A includes two planetary gear device units 50 and 60 that are arranged in the front-rear direction of the transmission case 3. The front planetary gear device unit 50 of the two planetary gear device units 50 and 60 is coupled to the input shaft 17 via the first gear interlocking mechanism 34. The stepless gearbox 18B is constituted by a hydrostatic stepless gearbox, and includes a variable capacity hydraulic pump P and a hydraulic motor M. A pump shaft of the stepless gearbox 18B is coupled to the input shaft 17 via the second gear interlocking mechanism 35 and the rotation shaft 31. A motor shaft of the stepless gearbox 18B is coupled to the front planetary gear device unit 50 of the two planetary gear device units 50 and 60 via the third gear interlocking mechanism 36.

In the main shift unit 18, the power from the engine 1 undergoes shifting by the stepless gearbox 18B, and the resultant power and the power that is transmitted from the engine 1 via the third gear interlocking mechanism 36 are input to the planetary gear device 18A and synthesized by the two planetary gear device units 50 and 60, and the synthesized power is output from a first output shaft 37a, a second output shaft 37b and a third output shaft 37c that are stacked concentrically.

Staging Transmission Unit

As shown in FIG. 2, the staging transmission unit 19 includes four staging clutches CL1 to CL4 to which the output of the planetary gear device 18A is input, and an output shaft 38 on which the staging clutches CL1 to CL4 are provided.

In the staging transmission unit 19, the synthesized power from the planetary gear device 18A is staged into four speed ranges and output from the output shaft 38, due to the stepless gearbox 18B and the four staging clutches CL1 to CL4 operating appropriately.

Figure 3:
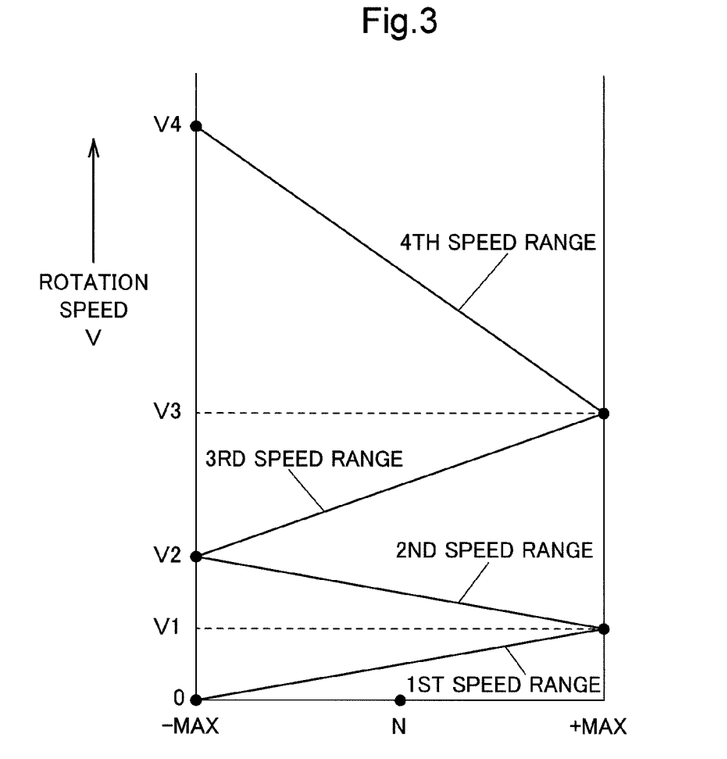
FIG. 3 is an illustrative diagram showing the relationship between a shift state of a stepless gearbox, speed ranges, and a rotation speed of an output shaft of a staging transmission unit.

FIG. 3 is an illustrative diagram showing the relationship between the shift state of the stepless gearbox 18B, the speed ranges, and a rotation speed V of an output shaft 38 of the staging transmission unit 19. The vertical axis in FIG. 3 shows the rotation speed V of the output shaft 38. The horizontal axis of FIG. 3 shows the shift state of the stepless gearbox 18B, with "N" indicating a neutral state, and "−MAX" indicating a maximum speed shift state in the negative rotation direction. "+MAX" indicates a maximum speed shift state in the positive rotation direction.

When the first clutch CL1 of the four staging clutches CL1 to CL4 is engaged and shift operation of the stepless gearbox 18B is performed, the power of the first output shaft 37a undergoes shifting by a first speed gear interlocking mechanism 39a and the first clutch CL1 and is output from the output shaft 38. As shown in FIG. 3, the rotation speed of the output shaft 38 will be a rotation speed in a first speed range, and the rotation speed V of the output shaft 38 increases steplessly from zero speed [0] to maximum speed [V1] of the first speed range, following shifting of the stepless gearbox 18B being performed toward "+MAX" from "−MAX".

When the second clutch CL2 of the four staging clutches CL1 to CL4 is engaged and shift operation of the stepless gearbox 18B is performed, the power of the third output shaft 37c undergoes shifting by a second speed gear interlocking mechanism 39b and the second clutch CL2 and is output from the output shaft 38. As shown in FIG. 3, the rotation speed of the output shaft 38 will be a rotation speed in a second speed range that is faster than the first speed range, and the rotation speed V of the output shaft 38 increases steplessly from minimum speed [V1] of the second speed range to maximum speed [V2] of the second speed range, following shifting of the stepless gearbox 18B being performed toward "−MAX" from "+MAX".

When the third clutch CL3 of the four staging clutches CL1 to CL4 is engaged and shift operation of the stepless gearbox 18B is performed, the power of the second output shaft 37b undergoes shifting by a third speed gear interlocking mechanism 39c and the third clutch CL3 and is output from the output shaft 38. As shown in FIG. 3, the rotation speed of the output shaft 38 will be a rotation speed in a third speed range that is faster than the second speed range, and the rotation speed V of the output shaft 38 increases steplessly from minimum speed [V2] of the third speed range to maximum speed [V3] of the third speed range, following shifting of the stepless gearbox 18B being performed toward "+MAX" from "−MAX".

When the fourth clutch CL4 of the four staging clutches CL1 to CL4 is engaged and shift operation of the stepless gearbox 18B is performed, the power of the third output shaft 37c undergoes shifting by a fourth speed gear interlocking mechanism 39d and the fourth clutch CL4 and is output from the output shaft 38. As shown in FIG. 3, the rotation speed of the output shaft 38 will be a rotation speed in a fourth speed range that is faster than the third speed range, and the rotation speed V of the output shaft 38 increases steplessly from minimum speed [V3] of the fourth speed range to maximum speed [V4] of the fourth speed range, following shifting of the stepless gearbox 18B being performed toward "−MAX" from "+MAX".

Forward-Reverse Switching Device

As shown in FIG. 2, the forward-reverse switching device 20 includes an input shaft 40 coupled to the output shaft 38 of the staging transmission unit 19, a forward clutch CLF and a reverse clutch CLR provided on the input shaft 40, and an output shaft 42 coupled to the forward clutch CLF via a forward gear mechanism 41f and coupled to the reverse clutch CLR via a reverse gear mechanism 41r. As shown in FIG. 2, the reverse gear mechanism 41r includes a counter gear 46 that meshes with a teeth portion of an output rotation member of the reverse clutch CLR. The counter gear 46 is relatively rotatably supported by the input shaft 22a of the rear wheel differential mechanism 22.

In the forward-reverse switching device 20, when the forward clutch CLF is engaged, the power transmitted from the staging transmission unit 19 to the input shaft 40 is converted into forward power by the forward clutch CLF and the forward gear mechanism 41f and output from the output shaft 42. When the reverse clutch CLR is engaged, the power transmitted from the staging transmission unit 19 to the input shaft 40 is converted into reverse power by the reverse clutch CLR and the reverse gear mechanism 41*r* and output from the output shaft 42. The forward power and reverse power that are output from the output shaft 42 are transmitted to the rear wheel gear interlocking mechanism 21, and are transmitted to the input shaft 22*a* of the rear wheel differential mechanism 22 by the rear wheel gear interlocking mechanism 21.

Front Wheel Transmission Device

As shown in FIG. 2, the front wheel transmission device 26 includes an input shaft 43 coupled to the input shaft 22*a* of the rear wheel differential mechanism 22 via the front wheel gear interlocking mechanism 25, a constant speed clutch CLT and a speed increasing clutch CLH provided on the input shaft 43, and an output shaft 45 coupled to the constant speed clutch CLT via a constant speed gear mechanism 44*a* and coupled to the speed increasing clutch CLH via a speed increasing gear mechanism 44*b*.

In the front wheel transmission device 26, when the constant speed clutch CLT is engaged, the power that is transmitted from the input shaft 22*a* of the rear wheel differential mechanism 22 to the input shaft 43 is transmitted to the output shaft 45 via the constant speed clutch CLT and the constant speed gear mechanism 44*a*, and is transmitted from the output shaft 45 to the front wheel differential mechanism 28. In this case, a state appears in which the pair of left/right front wheels 6 and the pair of left/right rear wheels 7 are driven in a state where the average peripheral speed of the pair of left/right front wheels 6 and the average peripheral speed of the pair of left/right rear wheels 7 are substantially equal, that is, a so-called equal front/rear wheel speed four-wheel drive state. When the speed increasing clutch CLH is engaged, the power that is transmitted from the input shaft 22*a* of the rear wheel differential mechanism 22 to the input shaft 43 is transmitted to the output shaft 45 via the speed increasing clutch CLH and the speed increasing gear mechanism 44*b*, and is transmitted from the output shaft 45 to the front wheel differential mechanism 28. In this case, a state appears in which the pair of left/right front wheels 6 and the pair of left/right rear wheels 7 are driven in a state where the average peripheral speed of the pair of left/right front wheels 6 is faster than the average peripheral speed of the pair of left/right rear wheels 7, that is, a so-called increased front wheel speed four-wheel drive state.

Planetary Gear Device

As shown in FIG. 2, the planetary gear device 18A includes the two planetary gear device units 50 and 60 arranged in the front-rear direction of the transmission case 3. The planetary gear device 18A is constituted by a compound planetary gear device. In the following description, the front planetary gear device unit 50 of the two planetary gear device units 50 and 60 will be referred to as a first planetary gear device unit 50, and the rear planetary gear device unit 60 of the two planetary gear device units 50 and 60 will be referred to as a second planetary gear device unit 60.

First Planetary Gear Device Unit

As shown in FIG. 2, the first planetary gear device unit 50 includes a first sun gear 51, a first planetary gear 52 that meshes with the first sun gear 51, a first internal gear 53 that meshes with the first planetary gear 52, and a first carrier 54 that rotatably supports the first planetary gear 52, and rotates about the axis of the first sun gear 51 together with the first planetary gear 52 that revolves around the first sun gear 51.

Second Planetary Gear Device Unit

As shown in FIG. 2, the second planetary gear device unit 60 includes a second sun gear 61, a second planetary gear 62 that meshes with the second sun gear 61, a second internal gear 63 that meshes with the second planetary gear 62, and a second carrier 64 that rotatably supports the second planetary gear 62, and rotates about the axis of the second sun gear 61 together with the second planetary gear 62 that revolve around the second sun gear 61.

The first planetary gear device unit 50 includes a transmission gear (not shown) that meshes with the first planetary gear 52, and a coupling member (not shown) that spans the first planetary gear device unit 50 and the second planetary gear device unit 60, and couples the transmission gear and the second planetary gear 62 in an interlocked manner. The first carrier 54 of the first planetary gear device unit 50 and the second carrier 64 of the second planetary gear device unit 60 are integrally rotatably coupled.

Second Speed Gear Interlocking Mechanism

As shown in FIG. 2, the second speed gear interlocking mechanism 39*b* includes an output transmission gear 82 provided in the third output shaft 37*c*, and an input gear 82*a* provided in an input member of the second clutch CL2 in a state of meshing with the output transmission gear 82.

Second Gear Interlocking Mechanism

As shown in FIG. 2, the second gear interlocking mechanism 35 includes a pump transmission gear 86 that is coupled to the rotation shaft 31 on the rear side with respect to the output transmission gear 82, and takes the power transmitted from the input shaft 17 to the rotation shaft 31 from the rotation shaft 31 and transmits this power to the hydraulic pump P.

First Gear Interlocking Mechanism

As shown in FIG. 2, the first gear interlocking mechanism 34 includes a first transmission gear 70 provided on the input shaft 17, a second transmission gear 71 coupled to the first internal gear 53, a first relay gear 72 that meshes with the first transmission gear 70, a second relay gear 73 that meshes with the second transmission gear 71. The first relay gear 72 and the second relay gear 73 are supported by a counter shaft 74 in a state of being coupled to the counter shaft 74.

Figure 4:
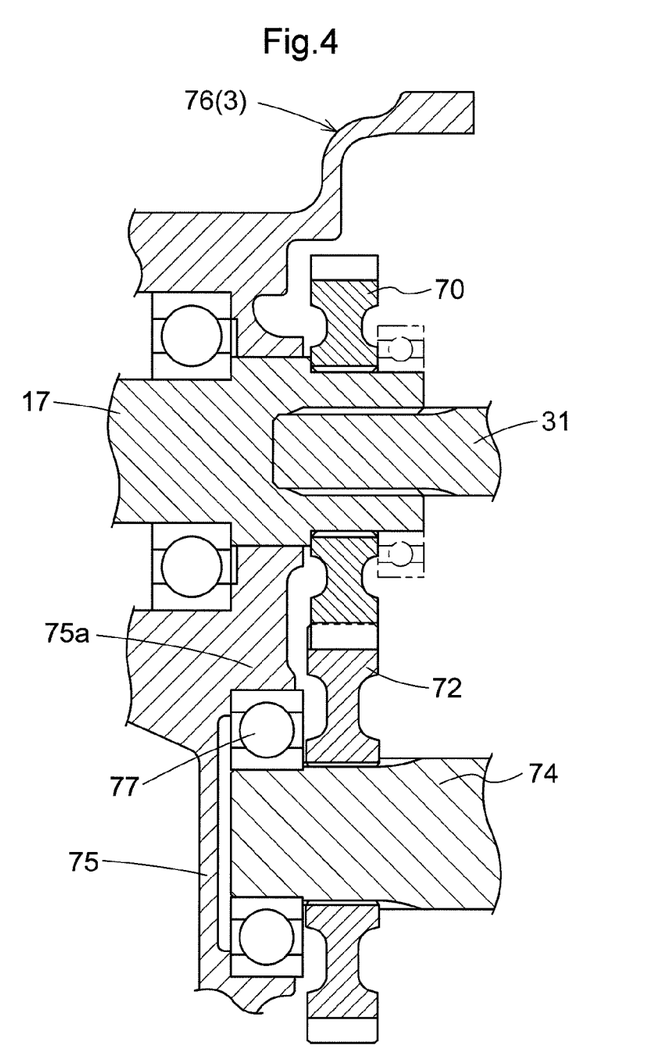
FIG. 4 is a cross-sectional view showing a first relay gear.

As shown in FIG. 4, the transmission case 3 includes a first wall part 75 that is located adjacent to the first relay gear 72 serving as a transmission gear. The first wall part 75 is provided in the transmission case 3 on the front side with respect to the first relay gear 72. In the present embodiment, the first wall part 75 is provided in a front cover 76 that is removably attached to a front portion of the transmission case 3 in a state of closing a front-facing opening of the transmission case 3. As shown in FIG. 4, a configuration is adopted in which the counter shaft 74 serving as a support shaft of the first relay gear 72 is supported by the first wall part 75. Specifically, as shown in FIG. 4, the counter shaft 74 is supported by a support part 75*a* formed in the first wall part 75 via a bearing 77 that is located between the support part 75*a* and the counter shaft 74.

The first relay gear 72 is provided in a state of sitting in the lubricating oil that is stored in the internal space of the transmission case 3.

Figure 5:
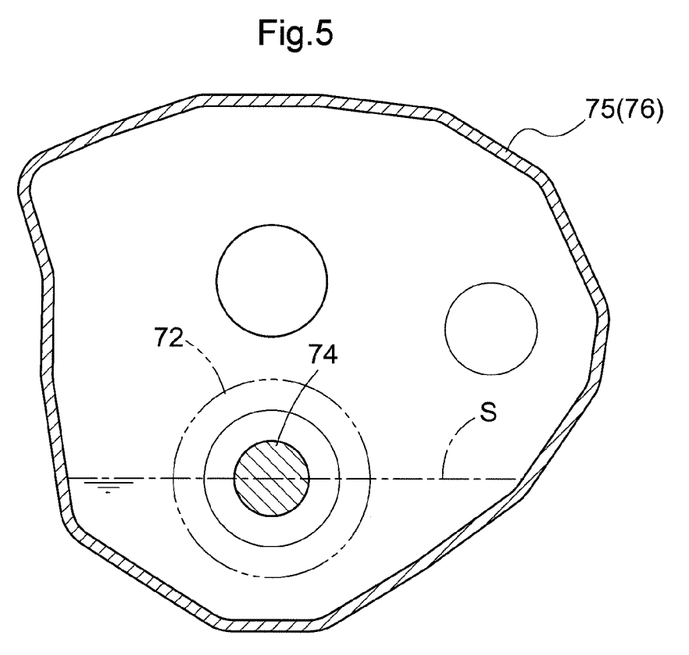
FIG. 5 is a rear view showing the first relay gear.

To explain in detail, as shown in FIG. 5, a configuration is adopted such that the position of an oil surface S of the lubricating oil that is stored in the transmission case 3 and the position of the counter shaft 74 will be the same. A lower portion of the first relay gear 72 is sitting in the lubricating oil.

Figure 6:
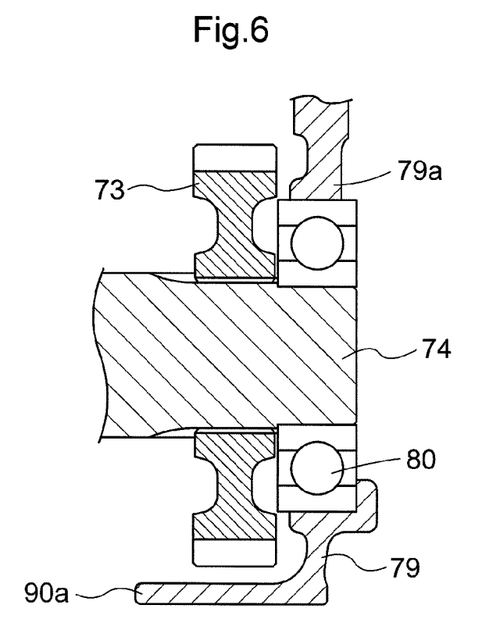
FIG. 6 is a cross-sectional view showing a second relay gear, a first cover part and a second wall part.

As shown in FIG. 6, the transmission case 3 includes a second wall part 79 that is located adjacent to the second relay gear 73. The second wall part 79 is provided in the transmission case 3 on the rear side with respect to the second relay gear 73. In the present embodiment, the second wall part 79 is produced as a separate member to the transmission case 3, and is provided in the transmission case 3 by being removably coupled inside the transmission case 3. As shown in FIG. 6, the counter shaft 74 serving as a support shaft of the second relay gear 73 is supported by the second wall part 79. In the present embodiment, the counter shaft 74 is supported by a support part 79a formed in the second wall part 79 via a bearing 80 that is located between the support part 79a and the counter shaft 74.

Figure 7:
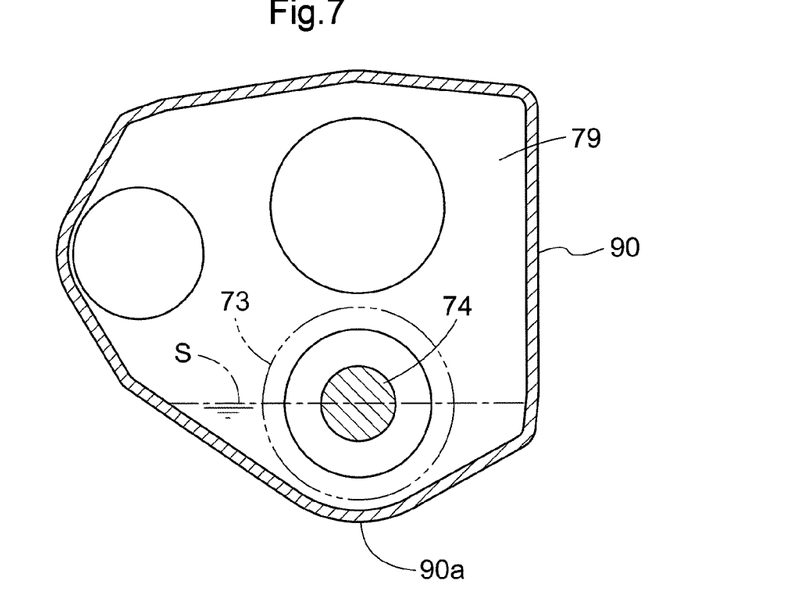
FIG. 7 is a front view showing the second relay gear, the first cover part and the second wall part.

The second relay gear 73 is provided in a state of sitting in the lubricating oil that is stored in the internal space of the transmission case 3. Specifically, as shown in FIG. 7, a lower portion of the second relay gear 73 is sitting in the lubricating oil. As shown in FIG. 7, a configuration is adopted in which a lower portion 90a of a flange part 90 provided on an outer peripheral portion of the second wall part 79 is located in an arc shape downward of the second relay gear 73. The lower portion 90a serves as a first cover part configured to cover the second relay gear 73 from outside the second relay gear 73 in the diameter direction of the second relay gear 73. Agitation of the lubricating oil that occurs due to the second relay gear 73 being rotated is inhibited from spreading to the lubricating oil storage area by the first cover part (lower portion 90a).

Rear Wheel Gear Interlocking Mechanism

Figure 8:
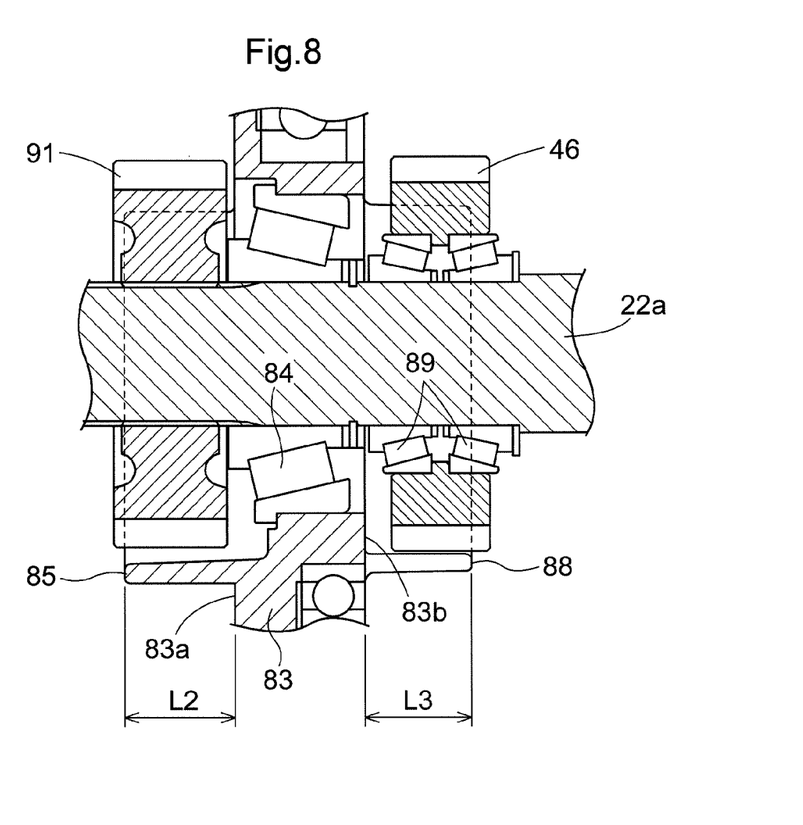
FIG. 8 is a cross-sectional view showing a transmission gear, a counter gear, a second cover part, a third cover part and a third wall part.

As shown in FIG. 2, the rear wheel gear interlocking mechanism 21 includes a transmission gear 91 that meshes with an output gear 20a of the forward-reverse switching device 20, and transmits the power of the output gear 20a to the input shaft 22a of the rear wheel differential mechanism 22. The transmission gear 91 is supported by the input shaft 22a. As shown in FIG. 8, the transmission case 3 includes a third wall part 83 that is located adjacent to the transmission gear 91. The third wall part 83 is provided in the transmission case 3 on the rear side with respect to the transmission gear 91. In the present embodiment, the third wall part 83 is produced as a separate member to the transmission case 3, and is provided in the transmission case 3 by being removably coupled inside the transmission case 3. As shown in FIG. 8, the input shaft 22a serving as a support shaft of the transmission gear 91 is supported by the third wall part 83. Specifically, as shown in FIG. 8, the input shaft 22a is supported by the wall part 83, via a bearing 84 provided between the third wall part 83 and the input shaft 22a.

Figure 9:
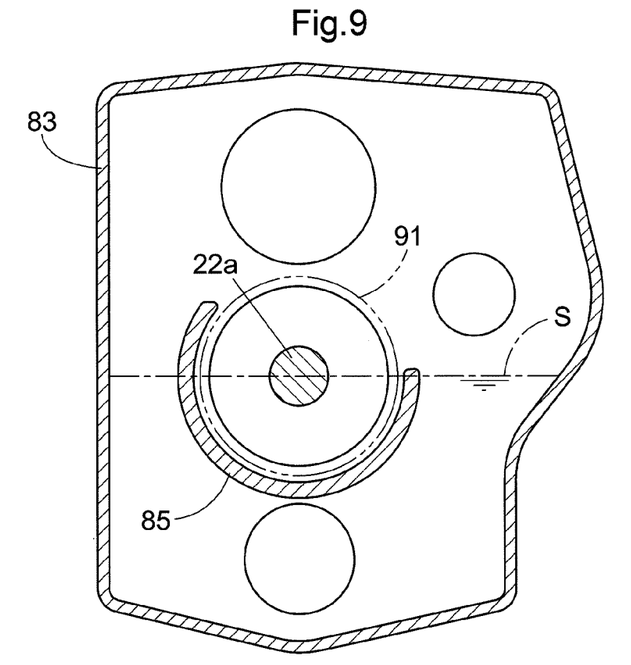
FIG. 9 is a front view showing the transmission gear and the second cover part.

As shown in FIG. 9, the transmission gear 91 is provided in a state of sitting in the lubricating oil that is stored in the internal space of the transmission case 3. As shown in FIGS. 8 and 9, a second cover part 85 protrudes toward the outer periphery of the transmission gear 91 from the third wall part 83. The second cover part 85 is configured to cover the transmission gear 91 from outside the transmission gear 91 in the diameter direction. Agitation of the lubricating oil that occurs due to the transmission gear 91 rotating is inhibited from spreading to the lubricating oil storage area by the second cover part 85.

To explain in detail, as shown in FIG. 9, a configuration is adopted such that the position of the oil surface S of the lubricating oil that is stored in the transmission case 3 and the position of the input shaft 22a will be the same. A lower portion of the transmission gear 91 is sitting in the lubricating oil. A lower portion of the second cover part 85 extends below the oil surface S and is sitting in the lubricating oil.

The second cover part 85 is constituted to be arc-shaped as viewed in a direction of the axis of the input shaft 22a. The second cover part 85 is integrally molded with the third wall part 83. As shown in FIG. 8, the second cover part 85 is constituted such that a protruding end portion is located on the opposite side to the third wall part side with respect to a side portion of the transmission gear 91 that is on the opposite side to the third wall part side. In the present embodiment, a protruding length L2 of the second cover part 85 from a front side portion 83a of the third wall part 83 is set to a length that covers the transmission gear 91 across the full width of the teeth portion of the transmission gear 91. The second cover part 85 is constituted to be located in an area of approximately 70% of the circumference of the transmission gear 91 in a gear circumferential direction.

Forward-Reverse Switching Device

As shown in FIG. 2, the reverse gear mechanism 41r in the forward-reverse switching device 20 includes the counter gear 46 serving as a transmission gear that meshes with the teeth portion of the output rotation member of the reverse clutch CLR.

As shown in FIG. 8, the transmission case 3 includes the third wall part 83 that is located adjacent to the counter gear 46. As shown in FIG. 8, the counter gear 46 is supported by the input shaft 22a via two bearings 89 provided between the counter gear 46 and the input shaft 22a. The input shaft 22a serving as a support shaft of the counter gear 46 is supported by the third wall part 83 via the bearing 84 provided between the counter gear 46 and the transmission gear 91.

Figure 10:
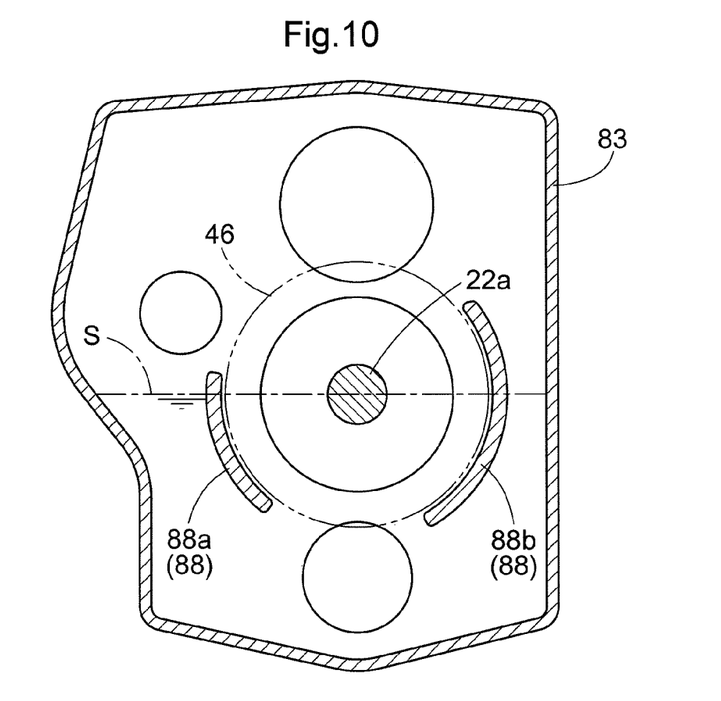
FIG. 10 is a rear view showing a counter gear and a third cover part.

The counter gear 46 is provided in a state of sitting in the lubricating oil that is stored in the internal space of the transmission case 3. As shown in FIGS. 8 and 10, the third cover part 88 protrudes toward the outer periphery of the counter gear 46 from the third wall part 83. The third cover part 88 is constituted to cover the counter gear 46 from outside in the diameter direction of the counter gear 46. The third cover part 88 protrudes from a rear side portion 83b of the third wall part 83. Agitation of the lubricating oil that occurs due to the counter gear 46 being rotated is inhibited from spreading to the lubricating oil storage area by the third cover part 88. In the present embodiment, the third cover part 88 includes a left cover part 88a positioned outward on a left lateral side of the counter gear 46 as viewed from the rear of the counter gear 46, and a right cover part 88b positioned outward on a right lateral side of the counter gear 46 as viewed from the rear of the counter gear 46.

To explain in detail, a configuration is adopted such that the position of the oil surface S of the lubricating oil that is stored in the transmission case 3 and the position of the input shaft 22a will be the same. A lower portion of the counter gear 46 is sitting in the lubricating oil. An intermediate portion of the third cover part 88 extends below the oil surface S and is sitting in the lubricating oil. Specifically, a lower portion of the left cover part 88a and a lower portion of the right cover part 88b are sitting in the lubricating oil.

The third cover part 88 is constituted to be arc-shaped as viewed in a direction of the axis of the input shaft 22a. The third cover part 88 is integrally molded with the third wall part 83. As shown in FIG. 8, the third cover part 88 is constituted such that a protruding end portion is located on the opposite side to the third wall part side with respect to a side portion of the counter gear 46 that is on the opposite side to the third wall part side. In the present embodiment, a protruding length L3 of the third cover part 88 from the rear side portion 83b of the third wall part 83 is set to a length that covers the counter gear 46 across the full width of the teeth portion of the counter gear 46.

Other Embodiments of First Embodiment (1) The above-described embodiment illustrates an example in which the planetary gear device 18A, the stepless gearbox 18B and the staging transmission unit 19 are provided, but the present invention is not limited thereto. A gear transmission may be adopted that is not provided with the planetary gear device 18A, the stepless gearbox 18B or the staging transmission unit 19, and only shifts with replacement of the shift gear, or a gear transmission may be adopted that only shifts with one of a planetary gear device and a stepless gearbox.

(2) The above-described embodiment illustrates an example in which the first cover part 90a, the second cover part 85 and the third cover part 88 are constituted in an arc shape, but the present invention is not limited thereto. For example, these parts may be constituted in a flat plate shape, a U-shape, or a folded plate shape.

(3) The above-described embodiment illustrates an example in which the first cover part 90a and the third cover part 88 are integrally molded with the wall part, but the present invention is not limited thereto, and the first cover part 90a and the third cover part 88 may be produced as a separate member to the wall part, and coupled by bolting to the wall part. The above-described embodiment illustrates an example in which the second cover part 85 is integrally molded with the third wall part 83, but the second cover part 85 may be produced as a separate member to the third cover part 88.

(4) The above-described embodiment illustrates an example in which the front wheels 6 and the rear wheels 7 are provided, but the present invention is not limited thereto. For example, a crawler travel device or a travel device combining wheels and a mini crawler may be provided.

Second Embodiment

Hereinafter, an embodiment (second embodiment) which is an example of the present invention will be described based on the drawings. Note that the overall configuration of the tractor and the like are the same as the first embodiment. Hereinafter, only the differences from the first embodiment will be described, and description of configuration that is the same will be omitted.

Front Wheel Gear Interlocking Mechanism

As shown in FIG. 2, the front wheel gear interlocking mechanism 25 includes a first transmission gear 177 provided on the input shaft 22a of the rear wheel differential mechanism 22 and a second transmission gear 178 that meshes with the first transmission gear 177. The second transmission gear 178 and the first transmission gear 177 are provided in a state where a support shaft 178a of the second transmission gear 178 is located below the input shaft 22a which is the support shaft of the first transmission gear 177.

In the front wheel gear interlocking mechanism 25, the output of the forward-reverse switching device 20 is transmitted to the front wheel transmission device 26, due to the power of the output gear 20a in the forward-reverse switching device 20 being transmitted to the first transmission gear 177 via the transmission gear 91 and the input shaft 22a, and the power of the first transmission gear 177 being transmitted to the input shaft 43 of the front wheel transmission device 26 via the second transmission gear 178 and the support shaft 178a.

Figure 11:
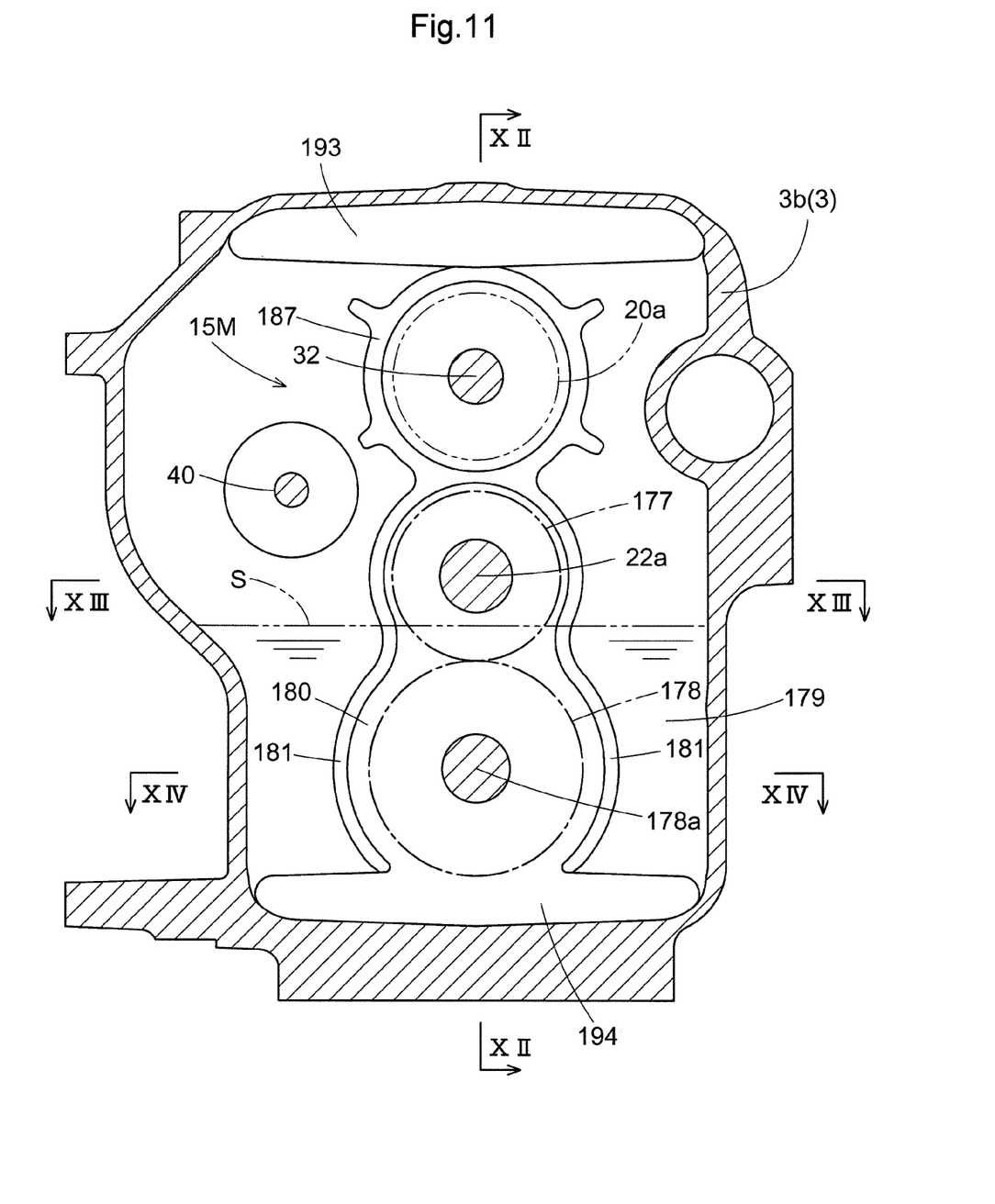
FIG. 11 is a diagram showing a second embodiment (same until FIG. 14), and is a vertical cross-section rear view of an inner case part.

A configuration is adopted in which the lubricating oil that achieves lubrication of the gear transmission 15M, the rear wheel differential mechanism 22 and the like is stored in the internal space of the transmission case 3. As shown in FIG. 11, it is favorable for the lubricating oil to be stored in a state where the position of the oil surface S of the lubricating oil and the position of the region of the first transmission gear 177 between the support shaft (input shaft 22a) of the first transmission gear 177 and the lower end of the first transmission gear 177 will be the same. The first transmission gear 177 and the second transmission gear 178 are provided in a state of sitting in the lubricating oil that is stored in the internal space of the transmission case 3.

Figure 12:
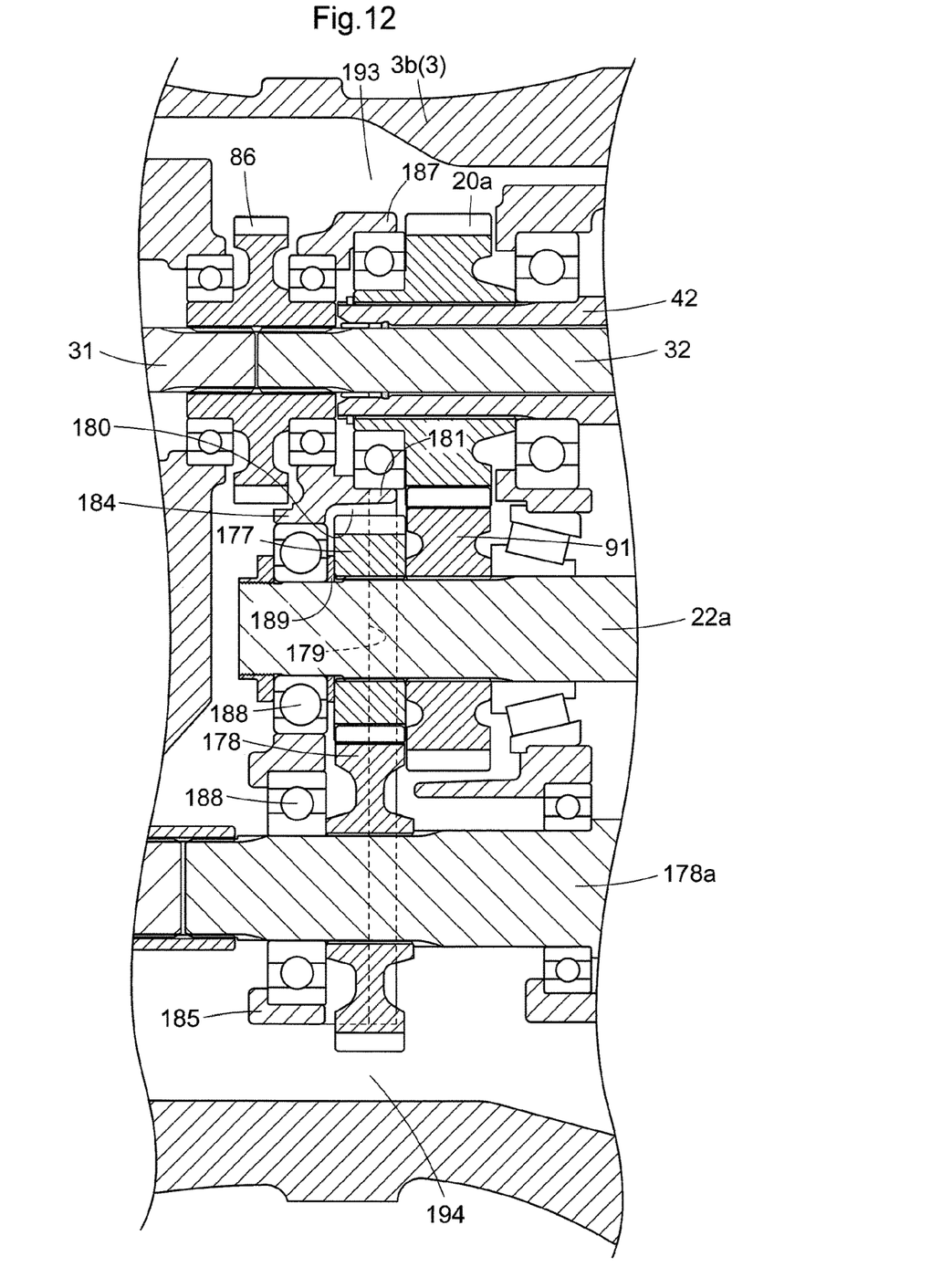
FIG. 12 is a cross-sectional view taken in the direction of arrows XII-XII in FIG. 11.
Figure 13:
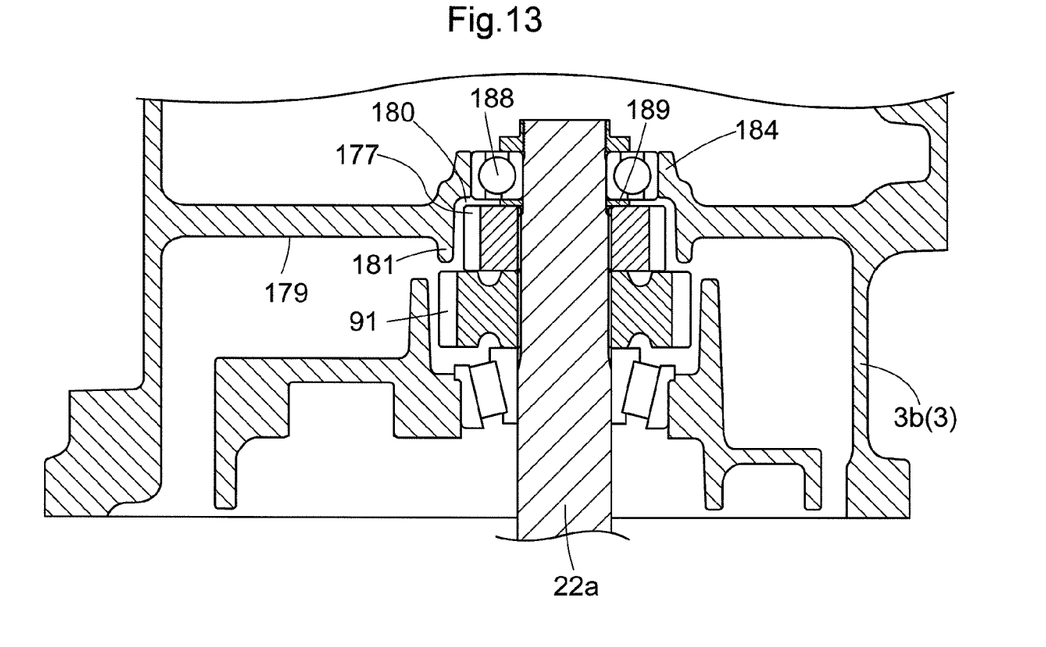
FIG. 13 is a cross-sectional view taken in the direction of arrows XIII-XII in FIG. 11.
Figure 14:
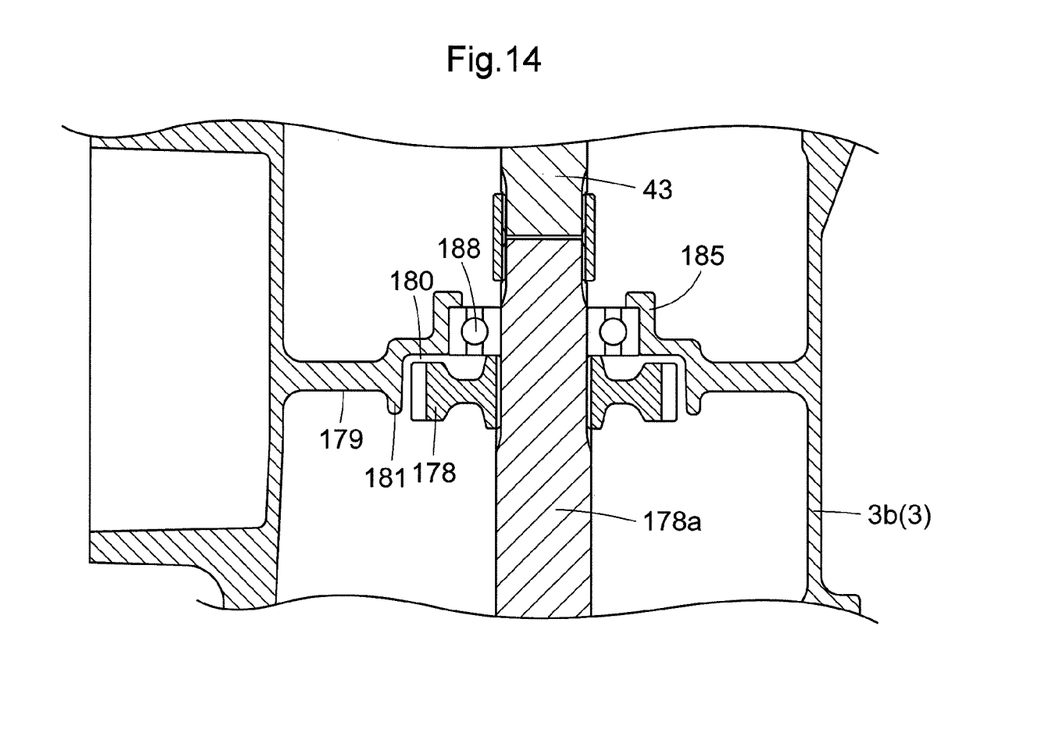
FIG. 14 is a cross-sectional view taken in the direction of arrows XIV-XIV in FIG. 11.

As shown in FIGS. 11, 12, and 13, an inner case part 3b of the transmission case 3 includes a wall part 179 that is located adjacent to the first transmission gear 177 and the second transmission gear 178. The wall part 179 includes a recessed part 180 in which the first transmission gear 177 and the second transmission gear 178 sit. On both lateral sides of the first transmission gear 177 and the second transmission gear 178, a cover part 181 protrudes toward outside the recessed part 180 from the wall part 179. The cover part 181 is constituted to circumferentially cover a region of the first transmission gear 177 and the second transmission gear 178 that is located outside the recessed part 180. Agitation of the lubricating oil due to rotation of the first transmission gear 177 and the second transmission gear 178 occurs inside the recessed part 180 and on the inner side of the cover part 181, and agitation of the lubricating oil by the first transmission gear 177 and the second transmission gear 178 tends not to spread to the lubricating oil storage area. In the present embodiment, the protruding length of the cover part 181 from the wall part 179 is a protruding length that covers part of the region of the first transmission gear 177 and the second transmission gear 178 that is located outside the recessed part 180, but the present invention is not limited thereto, and the protruding length may covers the whole of the region of the first transmission gear 177 and the second transmission gear 178 that is located outside the recessed part 180.

As shown in FIGS. 11, 12, 13 and 14, the cover part 181 that is located on both lateral sides of the first transmission gear 177 and the second transmission gear 178 protrudes toward outside the recessed part 180 from a region of the wall part 179 along the periphery of the recessed part 180. The cover part 181 is constituted such that the shape of the cover part 181 as viewed in a direction of the support shaft (input shaft 22a) of the first transmission gear 177 and the support shaft 178a of the second transmission gear 178 is arc-shaped. The side face of the cover part 181 on the first transmission gear 177 side, the side face of the cover part 181 on the second transmission gear 178 side, and the inner wall face of the recessed part 180 are located on the same plane. The cover part 181 is provided with a rib function of reinforcing the wall part 179 in a region of the wall part 179 that is located on the periphery of the recessed part 180. As shown in FIGS. 11 and 12, the cover part 181 and the support part 187 that supports the output gear 20a of the forward-reverse switching device 20 are provided on the wall part 179 in a state of being continuous.

As shown in FIGS. 12 and 13, the wall part 179 includes a first shaft support part 184 that supports the support shaft (input shaft 22a) of the first transmission gear 177 in a state where the support shaft (input shaft 22a) is inserted, and a second shaft support part 185 that supports the support shaft 178a of the second transmission gear 178 in a state where the support shaft 178a is inserted. The first shaft support part 184 and the second shaft support part 185 are each configured to support the support shaft (input shaft 22a, support shaft 178a) via a bearing 188. The wall part 179 supports the first transmission gear 177 via the bearing 188 and the support shaft (input shaft 22a), and supports the second transmission gear 178 via the bearing 188 and the support shaft 178a. A collar 189 is provided between the first transmission gear 177 and the bearing 188.

As shown in FIGS. 11 and 12, a void part 193 is provided between a peripheral wall part of the inner case part 3b and an upper portion of the wall part 179. A void part 194 is provided between a peripheral wall part in the inner case part 3b and a lower portion of the wall part 179.

Other Embodiment of Second Embodiment (1) The above-described embodiment illustrates an example in which the planetary gear device 18A, the stepless gearbox 18B and the staging transmission unit 19 are provided, but the present invention is not limited thereto. A gear transmission may be adopted that is not provided with the planetary gear device 18A, the stepless gearbox 18B or the staging transmission unit 19, and only shifts with replacement of the shift gear, or a gear transmission may be adopted that only shifts with one of a planetary gear device and a stepless gearbox.

(2) The above-described embodiment illustrates an example in which the cover part 181 is provided, but the cover part 181 need not be provided.

(3) The above-described embodiment illustrates an example in which the recessed part 180 is provided in the wall part 179 that supports the first transmission gear 177 and the second transmission gear 178, but the recessed part 180 may be provided in a wall part that only reinforces the transmission case 3, without supporting the first transmission gear 177 or the second transmission gear 178.

(4) The above-described embodiment illustrates an example in which the front wheels 6 and the rear wheels 7 are provided, but the present invention is not limited thereto. For example, a crawler travel device or a travel device combining wheels and a mini crawler may be provided.

The present invention is applicable to a power transmission device for a work vehicle that is used in various types of work vehicles apart from a tractor, such as a combine harvester and a multipurpose work vehicle.

LIST OF REFERENCE NUMERALS

First Embodiment

3 Transmission case
6 Travel device (front wheel)
7 Travel device (rear wheel)
46 Transmission gear (counter gear)
74 Support shaft (counter shaft)
22a Support shaft (input shaft)
73 Transmission gear (second relay gear)
79 Wall part (second wall part)
83 Wall part (third wall part)
85 Cover part (second cover part)
88 Cover part (third cover part)
90a Cover part (first cover part, lower portion)
91 Transmission gear Second Embodiment 15M Gear transmission
177 Transmission gear (first transmission gear)
178 Transmission gear (second transmission gear)
178a Support shaft
179 Wall part
180 Recessed part
184 Shaft support part (first shaft support part)
185 Shaft support part (second shaft support part)

What is claimed is:

1. A power transmission device for a work vehicle, comprising:
a transmission case;
a gear transmission housed in the transmission case and configured to transmit power to a travel device; and
a transmission gear provided in the gear transmission in a state of sitting in lubricating oil stored in an internal space of the transmission case,
wherein the transmission case is provided with a wall supporting a support shaft of the transmission gear while being adjacent to the transmission gear,
the wall is provided with a cover protruding from the wall toward an outer periphery of the transmission gear and covering the transmission gear such that the cover inhibits the spreading of lubricating oil, when agitated, to the lubricating oil stored in other regions of the internal space of the transmission case,
the cover is provided below the transmission gear in a state of sitting in the lubricating oil stored in the internal space of the transmission case, and
the wall is a separate member from the transmission case, such that the wall is removably coupled to the inside of the transmission case.

2. The power transmission device according to claim 1, wherein the cover is arc-shaped as viewed in a direction of an axis of the support shaft.

3. The power transmission device according to claim 1, wherein the cover is integrally molded with the wall.

4. The power transmission device according to claim 1, wherein the wall is provided with a shaft support configured to support the support shaft of the transmission gear in a state where the support shaft is disposed through the shaft support.

5. A power transmission device for a work vehicle, comprising:
a transmission case;
a gear transmission housed in the transmission case and configured to transmit power to a travel device; and
a plurality of transmission gears provided in the gear transmission in a state of sitting in lubricating oil stored in an internal space of the transmission case,
wherein the transmission case is provided with a wall supporting a support shaft of each of the plurality of transmission gears while being adjacent to the plurality of transmission gears, and
the wall is provided with a continuous recess in which the plurality of transmission gears sit, and
the transmission case is provided with a cover protruding from the wall toward an outside of the recess and circumferentially covering a region of the plurality of transmission gears, the region being located outside of the recess.

6. The power transmission device according to claim 5, wherein the cover protrudes from a region of the wall, the region extending along a periphery of the recess.

7. A power transmission device for a work vehicle, comprising:
a transmission case;
a gear transmission housed in the transmission case and configured to transmit power to a travel device; and
a transmission gear provided in the gear transmission in a state of sitting in lubricating oil stored in an internal space of the transmission case, wherein the transmission case is provided with a wall supporting a support shaft of the transmission gear while being adjacent to the transmission gear, the wall is provided with a cover protruding from the wall toward an outer periphery of the transmission gear and covering the transmission gear such that the cover inhibits the spreading of lubricating oil, when agitated, to the lubricating oil stored in other regions of the internal space of the transmission case, and a position of an oil surface of the lubricating oil and a position of the support shaft are the same.

\* \* \* \* \*